US011525661B2

(12) United States Patent
Hirano et al.

(10) Patent No.: US 11,525,661 B2
(45) Date of Patent: Dec. 13, 2022

(54) MAGNETIC UNIT, POSITION DETECTION APPARATUS, AND MAGNETIC MEMBER

(71) Applicant: TDK CORPORATION, Tokyo (JP)

(72) Inventors: Hiroyuki Hirano, Tokyo (JP); Teiichiro Oka, Tokyo (JP); Seiji Fukuoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 108 days.

(21) Appl. No.: 16/744,630

(22) Filed: Jan. 16, 2020

(65) Prior Publication Data

US 2020/0240762 A1 Jul. 30, 2020

(30) Foreign Application Priority Data

Jan. 29, 2019 (JP) .............................. JP2019-013656

(51) Int. Cl.
*G01B 7/00* (2006.01)
*G01D 5/20* (2006.01)
*H01F 7/08* (2006.01)

(52) U.S. Cl.
CPC ........... *G01B 7/003* (2013.01); *G01D 5/2033* (2013.01); *H01F 7/081* (2013.01); *H01F 2007/085* (2013.01)

(58) Field of Classification Search
CPC .............................. G01B 7/003; G01D 5/2033
See application file for complete search history.

(56) References Cited

U.S. PATENT DOCUMENTS

| | | | | |
|---|---|---|---|---|
| 5,644,227 A | * | 7/1997 | Geisei | ................... C03B 9/1936 |
| | | | | 324/207.15 |
| 6,163,148 A | * | 12/2000 | Takada | ..................... B62M 6/55 |
| | | | | 324/226 |
| 7,339,371 B2 | * | 3/2008 | Shimomura | ........... G01D 5/145 |
| | | | | 324/207.25 |
| 10,252,747 B2 | | 4/2019 | Shiino | |
| 2006/0113990 A1 | | 6/2006 | Schodlbauer | |
| 2019/0015971 A1 | | 1/2019 | Carrasco Zanini et al. | |

FOREIGN PATENT DOCUMENTS

| | | |
|---|---|---|
| CN | 1782657 A | 6/2006 |
| CN | 107003153 A | 8/2017 |
| JP | 2012-002325 A | 1/2012 |
| JP | 2013-83516 A | 5/2013 |
| JP | 2016-114536 A | 6/2016 |

* cited by examiner

*Primary Examiner* — Reena Aurora
(74) *Attorney, Agent, or Firm* — Oliff PLC

(57) ABSTRACT

A position detection apparatus includes a magnetic unit and a sensor. The magnetic unit includes a magnetic member and a retainer. The magnetic member includes a magnet and a first magnetic yoke. The magnet extends in an axial direction and has a cross-section orthogonal to the axial direction, and a first maximum outer diameter in a radial direction orthogonal to the axial direction. The cross-section has a substantially constant area in the axial direction. The first magnetic yoke is disposed adjacent to the magnet in the axial direction and has a second maximum outer diameter in the radial direction. The second maximum outer diameter is greater than the first maximum outer diameter. The retainer extends in the axial direction and retains the magnetic member. The sensor detects a magnetic field that changes in association with a movement of the magnetic unit along the axial direction.

14 Claims, 12 Drawing Sheets

MAGNETIC UNIT, POSITION DETECTION APPARATUS, AND MAGNETIC MEMBER

CROSS REFERENCE TO RELATED APPLICATIONS

This application claims the benefit of Japanese Priority Patent Application No. 2019-013656 filed on Jan. 29, 2019, and the entire contents of which are incorporated herein by reference.

BACKGROUND

The disclosure relates to a magnetic unit, a position detection apparatus, and a magnetic member.

Position detection apparatuses that detect a position of a specific object have been proposed. For example, Japanese Unexamined Patent Application Publication (JP-A) No. 2013-083516 discloses a position detection apparatus that includes a permanent magnet to be attached to a specific object of interest, and detects, with a magnetic sensor such as a magneto-resistive sensor, a change in magnetic field in accordance of a change in position of the permanent magnet.

SUMMARY

A magnetic unit according to one embodiment of the technology includes a magnetic member and a retainer that extends in an axial direction and retains the magnetic member. The magnetic member includes a magnet and a first magnetic yoke. The magnet extends in the axial direction and has a cross-section orthogonal to the axial direction, and a first maximum outer diameter in a radial direction orthogonal to the axial direction. The cross-section has a substantially constant area in the axial direction. The first magnetic yoke is disposed adjacent to a first end of the magnet in the axial direction and has a second maximum outer diameter in the radial direction. The second maximum outer diameter is greater than the first maximum outer diameter.

A position detection apparatus according to one embodiment of the technology includes a magnetic unit and a sensor. The magnetic unit includes a magnetic member a retainer that extends in an axial direction and retains the magnetic member. The magnetic member includes a magnet and a first magnetic yoke. The magnet extends in an axial direction and has a cross-section orthogonal to the axial direction, and a first maximum outer diameter in a radial direction orthogonal to the axial direction. The cross-section has a substantially constant area in the axial direction. The first magnetic yoke is disposed adjacent to the magnet in the axial direction and has a second maximum outer diameter in the radial direction. The second maximum outer diameter is greater than the first maximum outer diameter. The sensor is configured to detect a magnetic field that changes in association with a movement of the magnetic unit along the axial direction.

A magnetic member according to one embodiment of the technology includes a magnet and a magnetic yoke. The magnet extends in an axial direction and has a cross-section orthogonal to the axial direction, and a first maximum outer diameter in a radial direction orthogonal to the axial direction. The cross-section has a substantially constant area in the axial direction. The magnetic yoke is disposed adjacent to the magnet in the axial direction and has a second maximum outer diameter in the radial direction. The second maximum outer diameter is greater than the first maximum outer diameter.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1A:
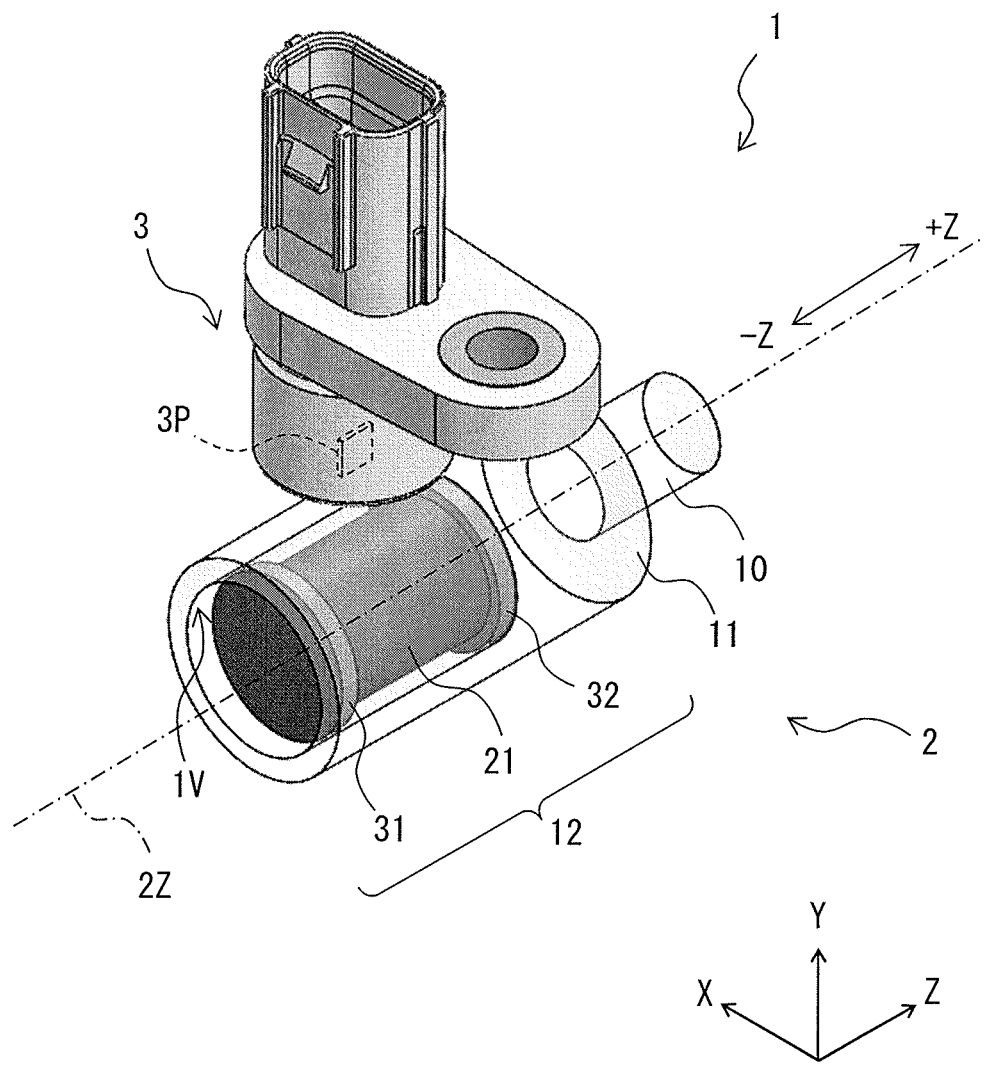
FIG. 1A is a perspective view of an overall configuration of a position detection apparatus according to one example embodiment of the technology.

There is a demand for downsizing a position detection apparatus. It is desirable to provide a position detection apparatus having a structure suitable for downsizing and a magnetic member and a magnetic unit to be installed in the position detection apparatus.

In the following, some example embodiments and modification examples of the technology are described in detail, in the following order, with reference to the accompanying drawings. Note that the following description is directed to illustrative examples of the technology and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Note that the like elements are denoted with the same reference numerals, and any redundant description thereof will not be described in detail. Note that the description is given in the following order.

1. Embodiment (An example in which a pair of magnetic yokes are disposed on respective ends of a magnet)
2. Modification Examples 1. Embodiment

[Example Configuration of Position Detection Apparatus 1]

Figure 1B:
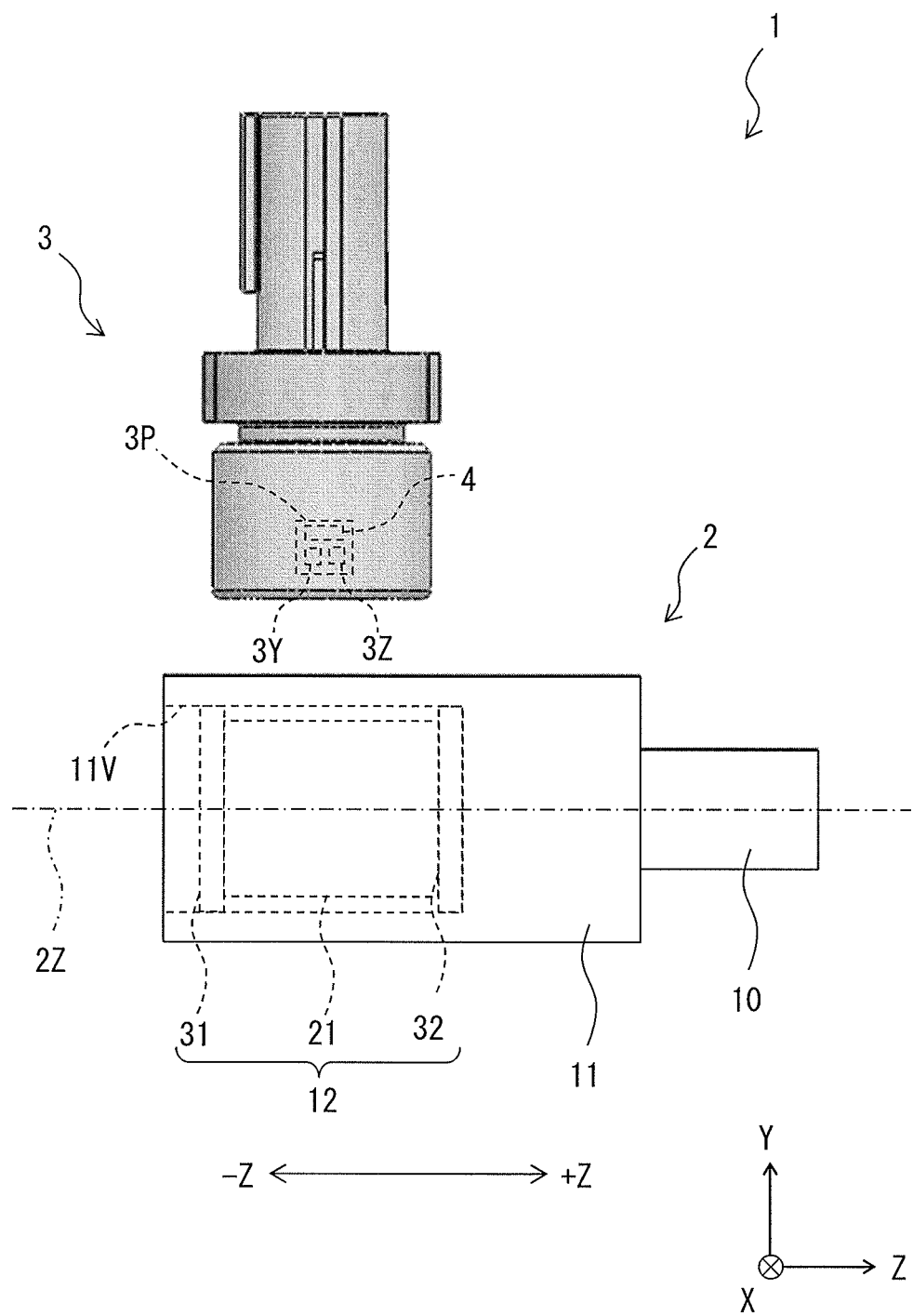
FIG. 1B is a front view of the overall configuration of the position detection apparatus illustrated in FIG. 1A.

FIG. 1A is a perspective view an exemplary overall configuration of a position detection apparatus 1 according to an embodiment of the technology. FIG. 1B is a front view of the position detection apparatus 1. In FIGS. 1A and 1B, internal configurations invisible from the outside are indicated by broken lines. The position detection apparatus 1 includes a magnetic unit 2 and a magnetic sensor unit 3, for example. The magnetic unit 2 of the position detection apparatus 1 is movable in a Z-axis direction (see FIG. 1A, etc.) relative to the magnetic sensor unit 3. For example, as illustrated in FIGS. 1A and 1B, the magnetic unit 2 may be reversibly movable in a +Z direction and a −Z direction. The position detection apparatus 1 may detect, with the magnetic sensor unit 3, an amount of movement of the magnetic unit 2 in the Z-axis direction along a center axis 2Z. Alternatively, the position detection apparatus 1 may detect, with the magnetic sensor unit 3, a relative position of the magnetic unit 2 in the Z-axis direction with respect to the position of the magnetic sensor unit 3, for example.

[Exemplary Configuration of Magnetic Unit 2]

The magnetic unit 2 may have the center axis 2Z extending along the Z-axis and include a shaft 10, holder 11, and magnetic member 12 disposed in order on the center axis 2Z. The magnetic unit 2 may correspond to a specific but non-limiting example of a magnetic unit according to one embodiment of the technology.

[Shaft 10]

The shaft 10 may be a substantially columnar or cylindrical member with a height in the Z-axis direction, for example. The shaft 10 may be disposed adjacent to the holder 11 along the center axis 2Z.

[Holder 11]

The holder 11 may be coupled to the shaft 10 at an end in the Z-axis direction. The holder 11 may have an internal space 11V therein. The internal space 11V may be a columnar space having a height in the Z-axis direction. The magnetic member 12 may be accommodated in the internal space 11V. The holder 11 may correspond to a specific but non-limiting example of a retainer according to one embodiment of the technology.

[Magnetic Member 12]

Figure 2:
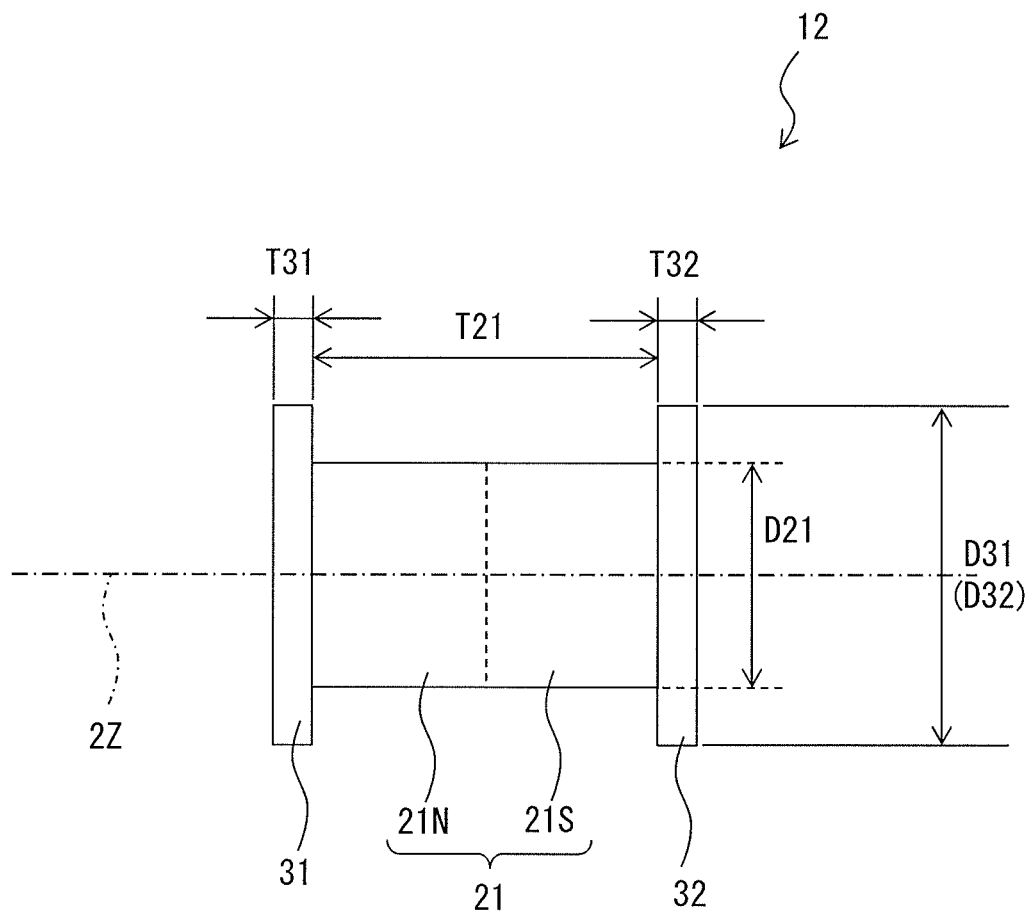
FIG. 2 is a front view of a magnetic member illustrated in FIG. 1A.
Figure 2:
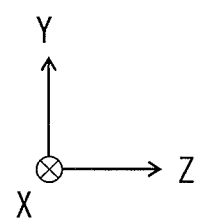

FIG. 2 is a front view of the magnetic member 12 illustrated in FIG. 1A. The magnetic member 12 may have a permanent magnet 21 and two magnetic yokes 31 and 32. The permanent magnet 21, the magnetic yokes 31 and 32, the holder 11, and the shaft 10 may be integrally movable reversibly in the +Z direction and −Z direction.

Figure 3A:
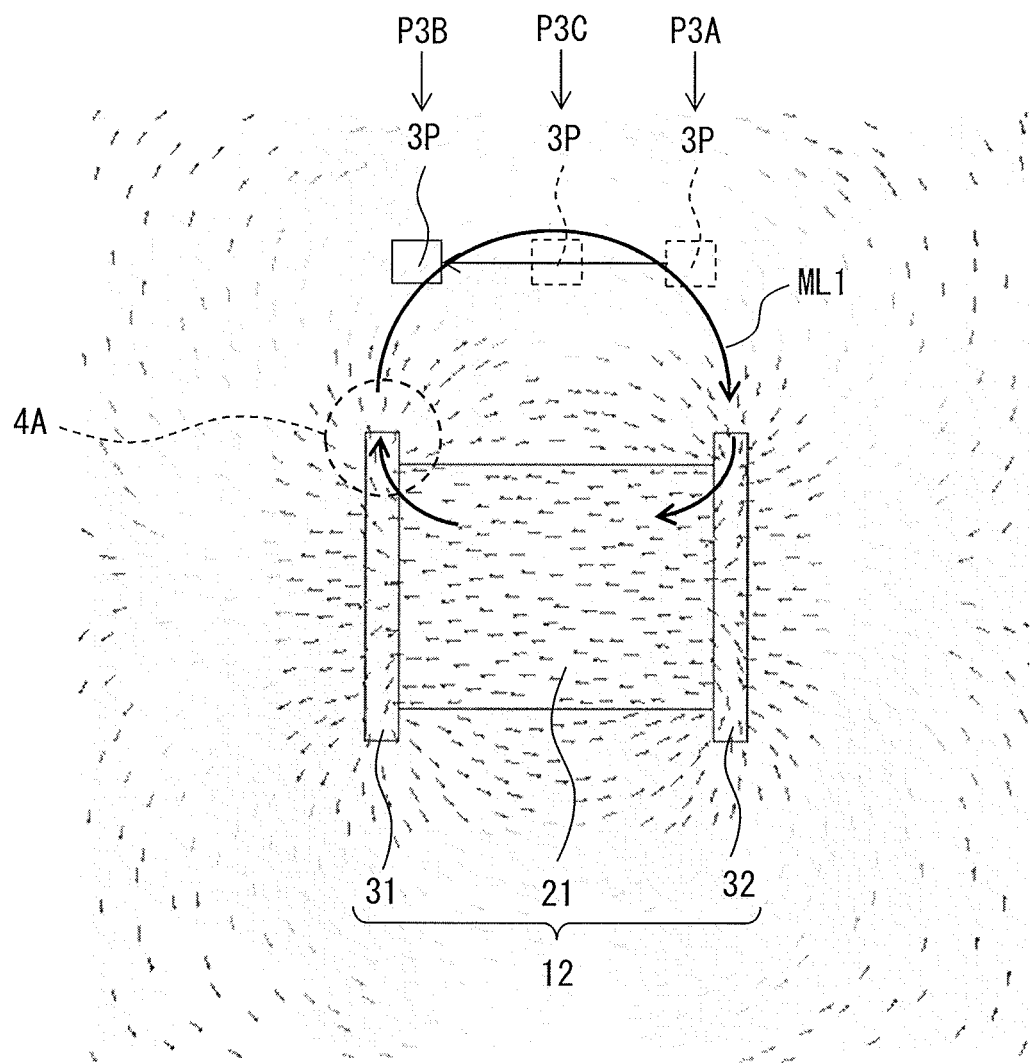
FIG. 3A is an explanatory diagram illustrating a magnetic field distribution formed around the magnetic member illustrated in FIG. 1A.
Figure 3A:
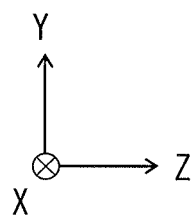

The permanent magnet 21 may extend along the center axis 2Z. The permanent magnet 21 may have an X-Y cross-section orthogonal to the Z-axis direction, and the X-Y cross-section may have an area substantially constant in the Z-axis direction. The permanent magnet 21 may have a columnar or cylindrical appearance with a height in, for example, the Z-axis direction. As illustrated in FIG. 2, the permanent magnet 21 may have a thickness T21 in the Z-axis direction, and a maximum outer diameter D21 in a radial direction along the X-Y cross-section orthogonal to the Z-axis direction. The permanent magnet 21 may include a hard ferromagnetic material including, for example, ferrite or a rare-earth element, and form a magnetic field distribution around itself, as illustrated in FIG. 3A described below. In the present embodiment, the permanent magnet 21 may be retained by the holder 11 such that a north (N) pole portion 21N and a south (S) pole portion 21S are aligned along the Z-axis direction.

The permanent magnet 21 may correspond to a specific but non-limiting example of a magnet according to one embodiment of the technology. The maximum outer diameter D21 may correspond to a specific but non-limiting example of a first maximum outer diameter according to one embodiment to the technology.

The magnetic yoke 31 is disposed adjacent to the permanent magnet 21 in the Z-axis direction, and has a maximum outer diameter D31 greater than the maximum outer diameter D21 in the radial direction along the X-Y cross-section. The magnetic yoke 32 may be disposed adjacent to one end of the permanent magnet 21 opposite to the other end of the permanent magnet 21 adjacent to the magnetic yoke 31. The magnetic yoke 32 may have a maximum outer diameter D32 greater than the maximum outer diameter D21 in the radial direction along the X-Y cross-section. The magnetic yokes 31 and 32 may be each a soft magnetic member including a soft magnetic metal material having a high saturation magnetic flux density, such as nickel-iron alloy (NiFe). The magnetic yokes 31 and 32 may include the same material or different materials. The magnetic yokes 31 and 32 may each have a columnar or cylindrical appearance with a height in the Z-axis direction, for example. As illustrated in FIG. 2, the magnetic yokes 31 and 32 may have respective thicknesses T31 and T32 in the Z-axis direction and respective maximum outer diameters D31 and D32 in the radial direction along the X-Y cross-section orthogonal to the Z-axis direction. In the example illustrated in FIG. 2, for instance, the thickness T31 and the thickness T32 may be equal to each other, and the maximum outer diameter D31 and the maximum outer diameter D32 may be equal to each other. Additionally, the thickness T21 of the permanent magnet 21 may be greater than the thickness T31 of the magnetic yoke 31 and the thickness of T32 of the magnetic yoke 32 in the present embodiment.

The magnetic yokes 31 may correspond to a specific but non-limiting example of a first magnetic yoke according to one embodiment of the technology. The magnetic yoke 32 may correspond to a specific but non-limiting example of a second magnetic yoke according to one embodiment of the technology. The maximum outer diameter D31 may correspond to a specific but non-limiting example of a second maximum outer diameter according to one embodiment of the technology. The maximum outer diameter D32 may correspond to a specific but non-limiting example of a third maximum outer diameter according to one embodiment of the technology. The thickness T21 may correspond to a specific but non-limiting example of a first thickness according to one embodiment of the technology. The thickness T31 may correspond to a specific but non-limiting example of a second thickness according to one embodiment of the technology. The thickness T32 may correspond to a specific but non-limiting example of a third thickness according to one embodiment of the technology.

[Exemplary Configuration of Magnetic Sensor Unit 3]

The magnetic sensor unit 3 may detect a magnetic field that changes in accordance with the movement of the magnetic unit 2 along the Z-axis direction. For example, the magnetic sensor unit 3 may detect an intensity and an orientation of a magnetic field projected on the Y-Z plane in the magnetic field distribution formed by the permanent magnet 21 of the magnetic member 12 in the magnetic unit 2, as illustrated in FIG. 3A. In one example, the magnetic sensor unit 3 may include a sensor package 3P that includes a Y-axis direction sensor element 3Y and a Z-axis direction sensor element 3Z, as illustrated in FIGS. 1A and 1B, for example. The magnetic sensor unit 3 may correspond to a specific but non-limiting example of a sensor according to one embodiment of the technology. The Y-axis direction sensor element 3Y and the Z-axis direction sensor element 3Z may be each a thin-film device including a magneto-resistive effect film, for example. For example, the Y-axis direction sensor element 3Y may detect a magnetic field intensity in the Y-axis direction, and the Z-axis direction sensor element 3Z may detect a magnetic field intensity in the Z-axis direction. In the example in which the Y-axis direction sensor element 3Y includes a magneto-resistive effect film, the magneto-resistive effect film may include a pinned layer having magnetization fixed in, for example, the Z-axis direction, and a free layer having magnetization rotatable on the Y-Z plane. In another example in which the Z-axis direction sensor element 3Z includes a magneto-resistive effect film, the magneto-resistive effect film may include a pinned layer having magnetization fixed in, for example, the Y-axis direction, and a free layer having magnetization rotatable on the Y-Z plane. The sensor package 3P may be an electronic chip device that includes, for example, the Y-axis direction sensor element 3Y, the Z-axis direction sensor element 3Z, and wiring lines disposed on a common substrate, and is encapsulated with resin, for example. With reference to FIG. 1B, the magnetic sensor unit 3 may further include an operation unit 4 that includes a microcontroller or microprocessor, for example. The operation unit 4 may detect a position of the magnetic unit 2 relative to the magnetic sensor unit 3 on the basis of one or both of the magnetic field intensity and the change in the magnetic field detected by the Y-axis direction sensor element 3Y and the Z-axis direction sensor element 3Z.

[Workings and Example Effects of Position Detection Apparatus 1]

In the position detection apparatus 1 according to the embodiment described above, the magnetic unit 2 may be movable along, for example, the center axis 2Z relative to the magnetic sensor unit 3. The position detection apparatus 1 may detect, with the magnetic sensor unit 3, an amount of movement of the magnetic unit 2 along the center axis 2Z in the Z-axis direction, or a relative position of the magnetic unit 2 in the direction along the center axis 2Z with respect to the magnetic sensor unit 3, for example.

For example, as illustrated in FIG. 3A, the position detection apparatus 1 may include the sensor package 3P accommodated in the magnetic sensor unit 3. The sensor package 3P may be disposed in a range on which the magnetic field distribution formed by the permanent magnet 21 of the magnetic member 12 impacts so that a magnetic line ML1 may pass through the sensor package 3P. FIG. 3A is a schematic diagram illustrating workings of the position detection apparatus 1. In FIG. 3A, the magnetic member 12 that includes the permanent magnet 21 and the magnetic yokes 31 and 32, the magnetic field distribution formed around the magnetic member 12, and the magnetic line ML1 are illustrated. In the example illustrated in FIG. 3A, the sensor package 3P may move toward the left side of the page from a position P3A indicated by a broken line via a position P3C indicated by another broken line to a position P3B indicated by a solid line in accordance with the movement of the magnetic unit 2 toward the right side of the page in the Z-axis direction, for example. In this example, the Y-axis direction sensor element 3Y and the Z-axis direction sensor element 3Z may detect a change in magnetic field intensity generated in association with the movement of the magnetic unit 2 and applied to the Y-axis direction sensor element 3Y and the Z-axis direction sensor element 3Z. In an example in which the Y-axis direction sensor element 3Y and the Z-axis direction sensor element 3Z each include a magneto-resistive effect film, the change in magnetic field intensity applied on the Y-axis direction sensor element 3Y and the Z-axis direction sensor element 3Z may be detected as a change in resistance. A relative position or an amount of movement of the magnetic unit 2 with respect to the sensor package 3P may be calculated by comparing the resistance at the position P3A, the resistance at the position P3C, and the resistance at the position P3B. Note that, in the example in which the Y-axis direction sensor element 3Y and the Z-axis direction sensor element 3Z each include the magneto-resistive effect film, a known relation may be established between the magnetic field intensity applied to the Y-axis direction sensor element 3Y and the Z-axis direction sensor element 3Z and the resistances of the Y-axis direction sensor element 3Y and the Z-axis direction sensor element 3Z.

In FIG. 3A, the position P3A corresponds a position near an interference between the permanent magnet 21 and the magnetic yoke 32, the position P3C corresponds to a position at the middle of the permanent magnet 21 in the Z-axis direction, and the position P3B corresponds to a position near an interference between the permanent magnet 21 and the magnetic yoke 31. The magnetic field applied to the sensor package 3P may include a −Y direction component and a +Z direction component in a range between the position P3A and the position P3C, substantially only the +Z direction component at the position P3C, and a +Y direction component and the +Z direction component in a range between the position P3C and the position P3B. Accordingly, as illustrated in a table at a bottom of the FIG. 3A, the magnetic field intensity in the +Y direction applied to the sensor package 3P may become negative in the range between the position P3A to the position P3C, substantially zero (0) at the position of the P3C, and positive in the range between the position P3C and the position P3B. Additionally, as illustrated in the table at the bottom of FIG. 3A, the magnetic field intensity in the +Z direction applied to the sensor package 3P may become low in the range between the position P3A and the position P3C, high (maximum) at the position P3C, and low in the range between the position P3C and the position P3B. For instance, the Y-axis direction sensor element 3Y in the sensor package 3P may detect the magnetic field intensity in the Y-axis direction, and the Z-axis direction sensor element 3Z in the sensor package 3P may detect the magnetic field intensity in the Z-axis direction. The sensor package 3P may detect an orientation of the magnetic field applied to the sensor package 3P on the basis of the resistance of the Y-axis direction sensor element 3Y in accordance with the magnetic field intensity in the Y-axis direction and the resistance of the Z-axis direction sensor element 3Z in accordance with the magnetic field intensity in the Z-axis direction, to detect a relative position (an amount of movement) of the magnetic unit 2 in the Z-axis direction.

Although a relative position (an amount of movement) of the magnetic unit 2 may be detected by both of the Y-axis direction sensor element 3Y and the Z-axis direction sensor element 3Z in the embodiment described above, a relative position (an amount of movement) of the magnetic unit 2 with respect to the sensor package 3P may be detected only by the Y-axis direction sensor element 3Y or only by the Z-axis direction sensor element 3Z. Note that, however, the detection by use of both of the Y-axis direction sensor element 3Y and the Z-axis direction sensor element 3Z may be more advantageous in terms of detection accuracy and a detection range.

Figure 3B:
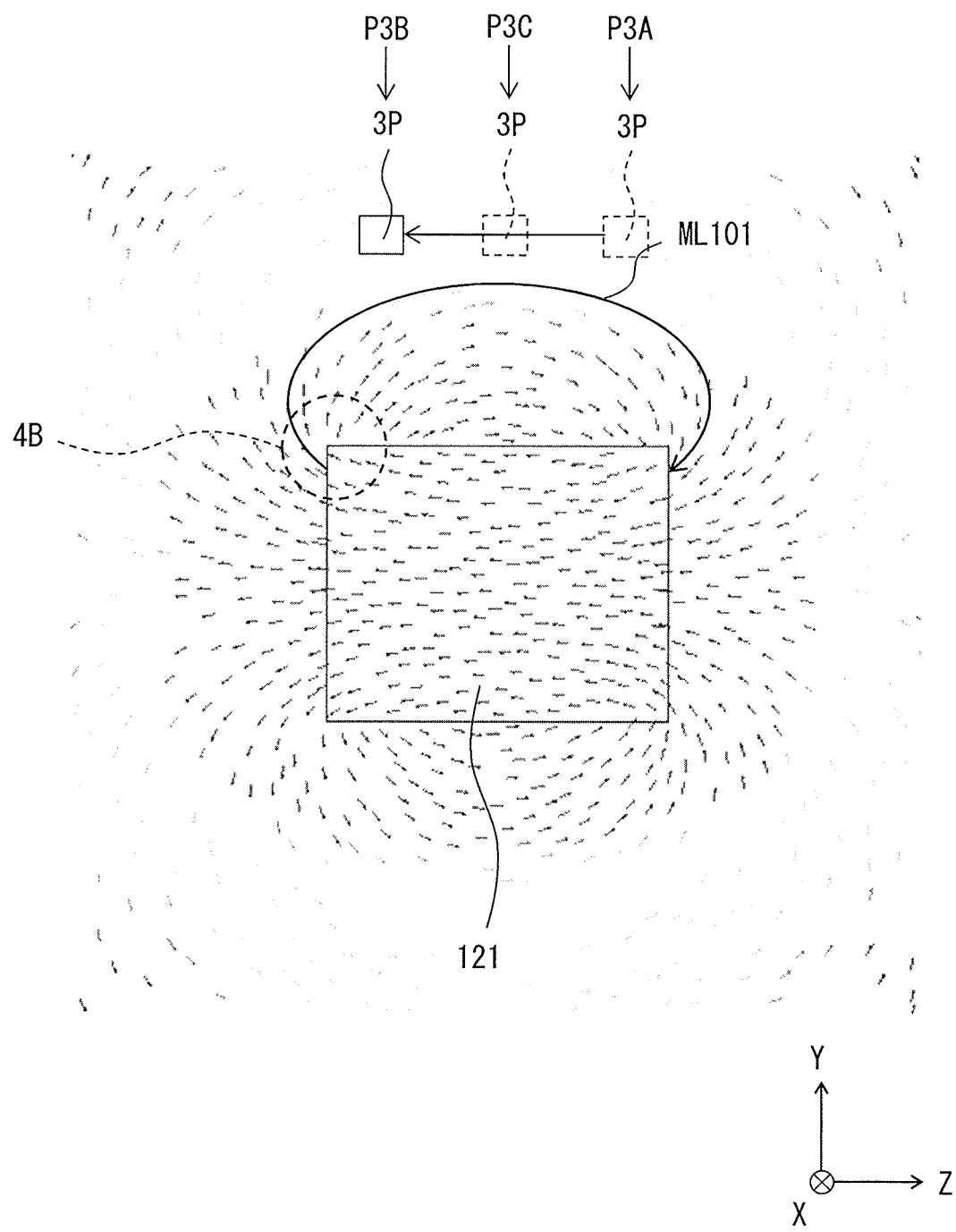
FIG. 3B is an explanatory diagram illustrating a magnetic field distribution formed around a magnet according to a reference example.

In the embodiment described above, the magnetic unit 2 includes the permanent magnet 21 and the magnetic yokes 31 and 32 that are disposed adjacent to the respective ends of the permanent magnet 21 in the Z-axis direction. Additionally, the maximum outer diameter D31 of the magnetic yoke 31 and the maximum outer diameter D32 of the magnetic yoke 32 may be greater than the maximum outer diameter of the permanent magnet 21. Therefore, the magnetic yokes 31 and 32 may protrude further in the radial direction of the permanent magnet 21 than the permanent magnet 21 does. This increases the magnetic field intensity in the radial direction generated by the magnetic member 12 according to the present embodiment. Compared with a reference example illustrated in FIG. 3B in which a permanent magnet 121 is solely disposed, for example, a higher magnetic field intensity is applied to the sensor package 3P. In FIG. 3B illustrating the reference example, the permanent magnet 121 is solely disposed and a magnetic field distribution and a magnetic line ML 101 are generated around the permanent magnet 121. In the reference example illustrated in FIG. 3B, the magnetic line ML101 having an intensity identical to that of the magnetic line ML1 illustrated in FIG. 3A does not reach the sensor package 3P.

Figure 4A:
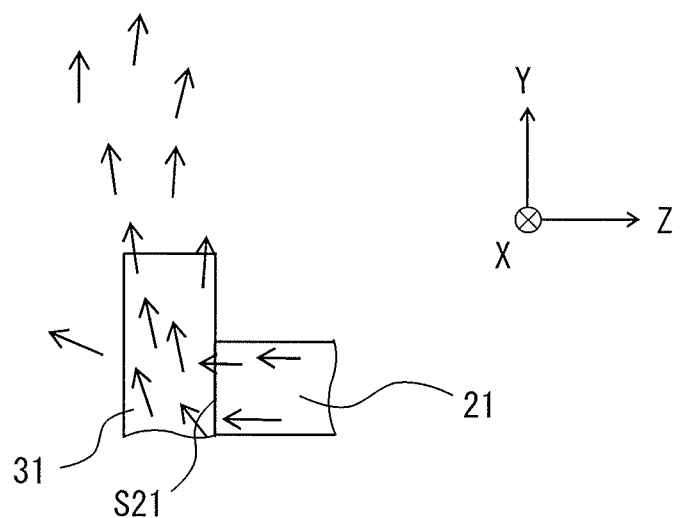
FIG. 4A is an enlarged view of the magnetic field distribution formed near an end of the magnetic member illustrated in FIG. 3A.

The magnetic field distribution illustrated in FIG. 3A may be different from the magnetic field distribution illustrated in the FIG. 3B as described below. FIG. 4A is an enlarged view of the magnetic field distribution formed near an end of the magnetic member 12 illustrated in FIG. 3A. As illustrated in FIG. 4A, the permanent magnet 21 of the magnetic member 12 according to the embodiment may generate, from an end face S21, a magnetic line directed in the Z-axis direction. At the magnetic yoke 31, the magnetic line may undergo a significant change in direction from the Z-axis direction to the direction in which the magnetic yoke 31 protrudes, i.e., the radial direction of the permanent magnet 21 orthogonal to the Z-axis direction. This may increase the magnetic field intensity in the radial direction orthogonal to the Z-axis direction in the magnetic member 12 according to the present embodiment.

Figure 4B:
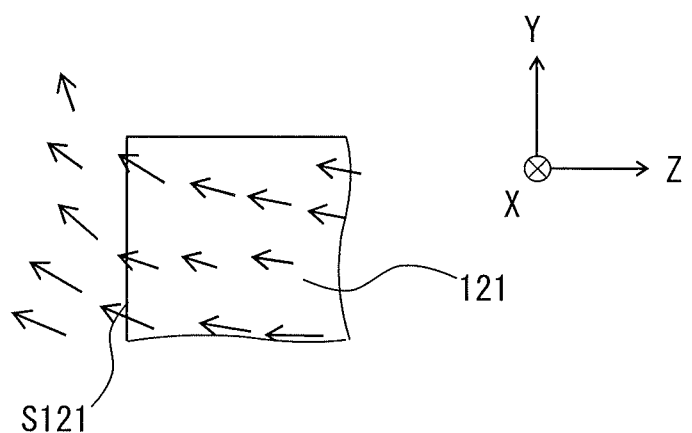
FIG. 4B is an enlarged view of the magnetic field distribution formed around the magnet according to the reference example illustrated in FIG. 3B.

In contrast, in the reference example in which only the permanent magnet 121 is disposed, the magnetic line passing through an end face S121 of the permanent magnet 121 to the outside remains directed in the Z-axis direction, and undergo a moderate change in direction from the Z-axis direction to the radial direction of the permanent magnet 121 afterwards, as illustrated in FIG. 4B. This may result in a decrease in the magnetic field intensity in the radial direction orthogonal to the Z-axis direction, compared with the magnetic member 12 according to the present embodiment.

Figure 5A:
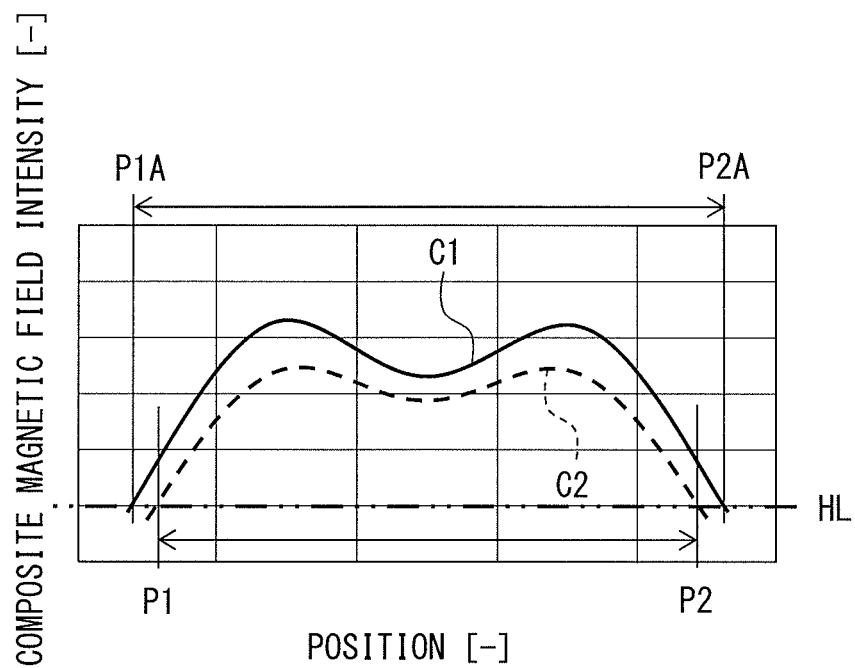
FIG. 5A is a characteristic diagram of the intensity distribution of the magnetic field along an axial direction generated by the magnetic member illustrated in FIG. 3A.

FIG. 5A illustrates the relation between a position of the magnetic member 12 in the Z-axis direction and a composite magnetic field intensity applied to the magnetic sensor unit 3. In FIG. 5A, a horizontal axis represents a position of the magnetic member 12 in the Z-axis direction, and a vertical axis represents the composite magnetic field intensity applied to the magnetic sensor unit 3. The term "composite magnetic field intensity" as used herein may refer to a composite of a magnetic field intensity in the Y-axis direction and a magnetic field intensity in the Z-axis direction. A chain double-dashed line with reference characters HL indicates a minimum magnetic field intensity detectable with the magnetic sensor unit 3. A solid line with reference characters C1 represents an intensity distribution of the magnetic field generated by the magnetic member 12 according to the present embodiment. A broken line with reference characters C2 represents an intensity distribution of the magnetic field generated only by the permanent magnet 21. As illustrated in FIG. 5A, the minimum magnetic field intensity HL is secured in a range from a position P1 to a position P2 in the intensity distribution of the magnetic field generated only by the permanent magnet 21 (represented by the curve C2). In contrast, the maximum magnetic field intensity HL is ensured in a larger range from a position P1A to a position P2A in the intensity distribution of the magnetic field generated by the magnetic member 12 (represented by the curve C1). Accordingly, a position of the magnetic unit 2 may be detected in a larger range by adding the magnetic yokes 31 and 32 to the permanent magnet 21.

Figure 5B:
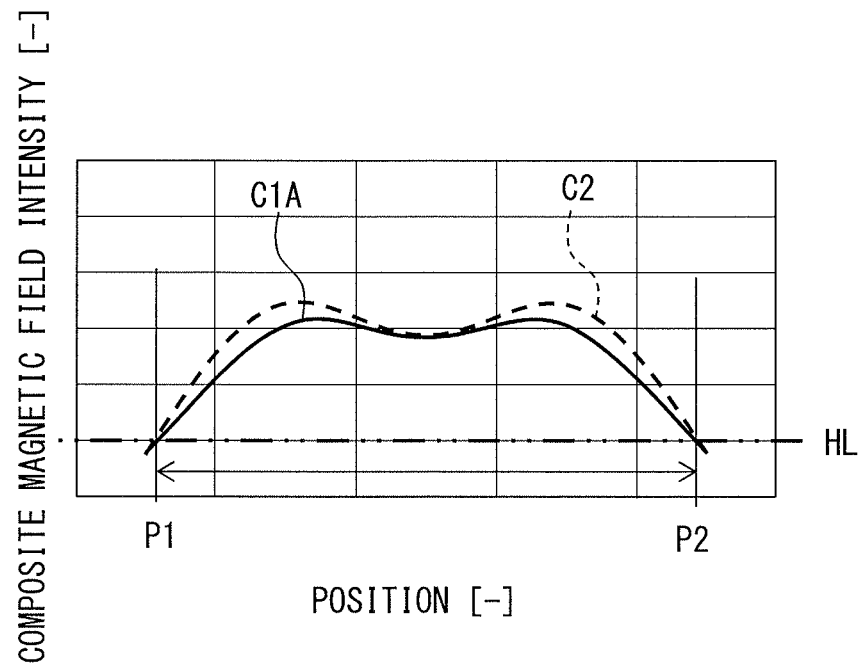
FIG. 5B is a characteristic diagram of the intensity distribution of the magnetic field along an axial direction generated by a magnetic member that includes a magnet smaller than that in the magnetic member illustrated in FIG. 3A.

FIG. 5B illustrates a relation between a position of the magnetic member 12 in the Z-axis direction and a composite magnetic field intensity applied to the magnetic sensor unit 3. In an example illustrated in FIG. 5B, the permanent magnet 21 of the magnetic member 12 may be reduced in volume so that the minimum magnetic field intensity HL is secured in the range from the position P1 to the position P2 as illustrated by a curve C1A. A curve C2 illustrated in FIG. 5B is the same as the curve C2 illustrated in FIG. 5A. The permanent magnet 21 having the intensity distribution of the magnetic field indicated by the curve C1A may have a volume four-fifths the volume of the permanent magnet 21 having the intensity distribution of the magnetic field indicated by the curve C2. The magnetic member 12 according to the present embodiment is thus advantageous in terms of a reduction in size and weight.

Figure 6:
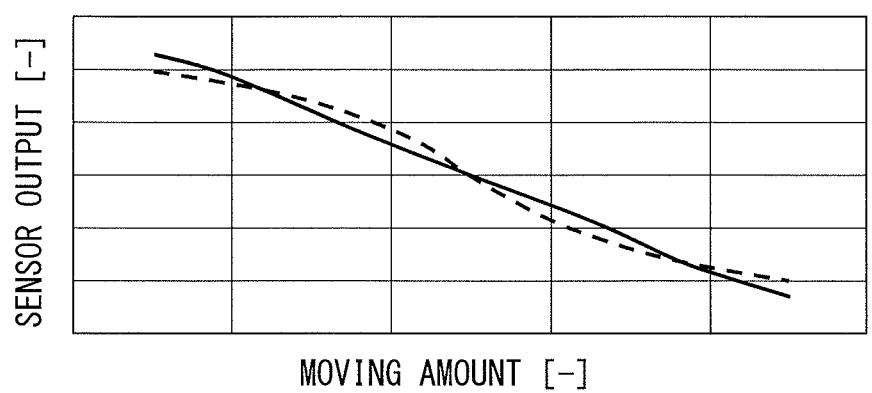
FIG. 6 is a characteristic diagram illustrating a relation between a position of the magnetic member along the axial direction and a sensor output obtained from a magnetic sensor unit in the position detection apparatus illustrated in FIG. 1.

Additionally, according to the magnetic member 12 of the present embodiment that includes the magnetic yokes 31 and 32 in addition to the permanent magnet 21, a voltage outputted from the magnetic sensor unit 3 to a position of the magnetic unit 2 in the Z-axis direction may be controlled to change more linearly by adjusting dimensions, such as the maximum outer diameters D31 and D32 or the thicknesses T31 and T32, of the magnetic yokes 31 and 32 or changing the constitute material of the magnetic yokes 31 and 32. This provides greater freedom of design. FIG. 6 is a characteristic diagram illustrating a relation between a position of the magnetic unit 2 in the Z-axis direction and an output voltage from the magnetic sensor unit 3. In FIG. 6, a horizontal axis represents a position of the magnetic unit 2 in the Z-axis direction, and a vertical axis represents an output voltage or sensor output obtained from the magnetic sensor unit 3. In FIG. 6, a solid line represents a characteristic of the magnetic member 12 according to the present embodiment, and a broken line represents a characteristic of a magnetic member without the magnetic yokes 31 and 32. As apparent from FIG. 6, the solid line is more linear than the broken line.

JP-A No. 2013-083516 described above discloses a position detection sensor that includes a magnetic field generator. The magnetic field generator includes a predetermined number of magnets and a predetermined number of soft magnetic members that are coupled in a linear fashion in a rectilinear movement direction of an object subjected to position detection. The magnets and the soft magnetic members in the position detection sensor disclosed in JP-A No. 2013-083516, however, have substantially the same size in a direction parallel to a plane orthogonal to the rectilinear movement direction. Therefore, the workings and example effects of the magnetic member 12 of the magnetic unit 2 according to the present embodiment are not able to be obtained by the magnets and the soft magnetic members disclosed in JP-A No. 2013-083516.

2. Modification Example

Although some example embodiments of the technology are described above, the embodiments are non-limiting examples, and may be modified in various ways. For example, although the magnetic yokes 31 and 32 that have the respective maximum outer diameters D31 and D32 greater than the maximum outer diameter D21 of the permanent magnet 21 are disposed adjacent to the respective ends of the single permanent magnet 21 in the magnetic member 12 of the foregoing embodiments described above, the magnetic member of embodiments of the technology should not be limited thereto.

For example, the magnetic member according to some embodiments of the technology may be any of magnetic members 12A to 12F according to Modification Examples 1 to 6 illustrated in FIGS. 7A to 7F.

Figure 7A:
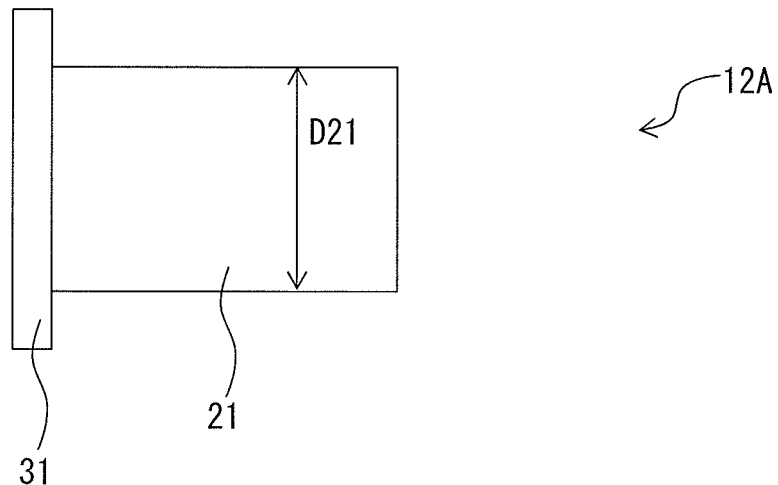
FIG. 7A is a front view of an overall configuration of a magnetic member according to one modification example of the technology.

The magnetic member 12A according to Modification Example 1 illustrated in FIG. 7A may be different from the magnetic member 12 according to any of the embodiments described above in that the magnetic member 12A does not include the magnetic yoke 32.

Figure 7B:
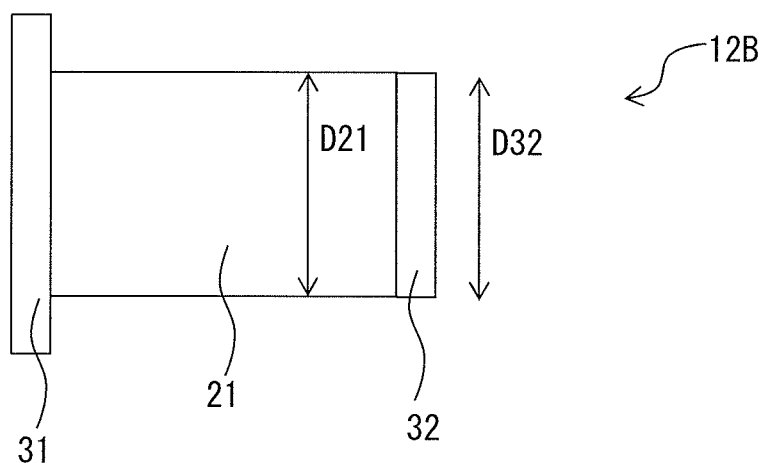
FIG. 7B is a front view of an overall configuration of a magnetic member according to one modification example of the technology.

The magnetic member 12B according to Modification Example 2 illustrated in FIG. 7B may include the magnetic yoke 32 having the maximum outer diameter D32 that is substantially equal to the maximum outer diameter D21 of the permanent magnet 21.

Figure 7C:
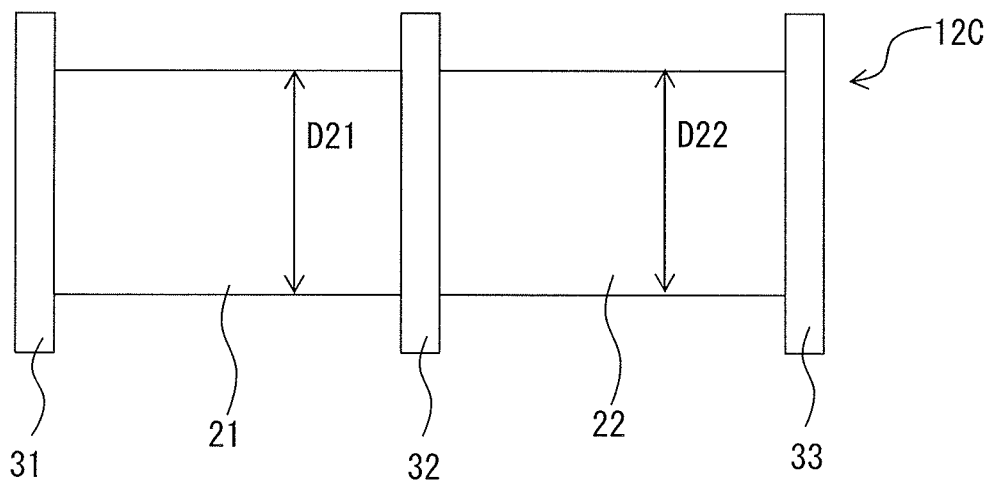
FIG. 7C is a front view of an overall configuration of a magnetic member according to one modification example of the technology.

The magnetic member 12C according to Modification Example 3 illustrated in FIG. 7C may be different from the magnetic member 12 according to any of the embodiments described above in that the magnetic member 12C further includes a permanent magnet 22 and a magnetic yoke 33.

Figure 7D:
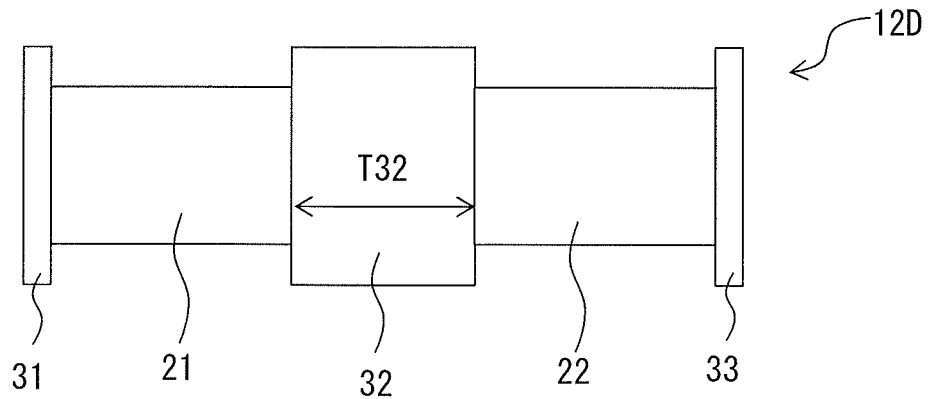
FIG. 7D is a front view of an overall configuration of a magnetic member according to one modification example of the technology.

The magnetic member 12D according to Modification Example 4 illustrated in FIG. 7D may be different from the magnetic member 12C according to Modification Example 3 illustrated in FIG. 7C in that the magnetic yoke 32 in the magnetic member 12D has a thickness T32 greater than that in the magnetic member 12C.

Figure 7E:
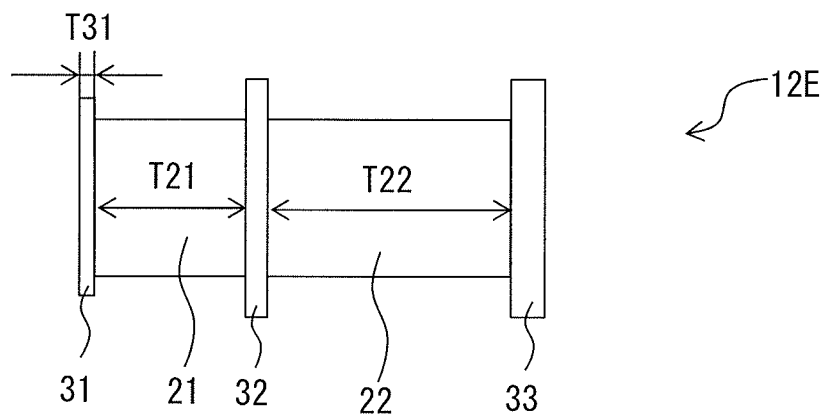
FIG. 7E is a front view of an overall configuration of a magnetic member according to one modification example of the technology.

The magnetic member 12E according to Modification Example 5 illustrated in FIG. 7E may be different from the magnetic member 12C according to Modification Example 3 illustrated in FIG. 7C in that the permanent magnet 21 in the magnetic member 12E has a thickness T21 smaller than that in the magnetic member 12C, the magnetic yoke 31 in the magnetic member 12E has a thickness T31 smaller than that in the magnetic member 12C, and the maximum outer diameter D31 smaller than that in the magnetic member 12C.

Figure 7F:
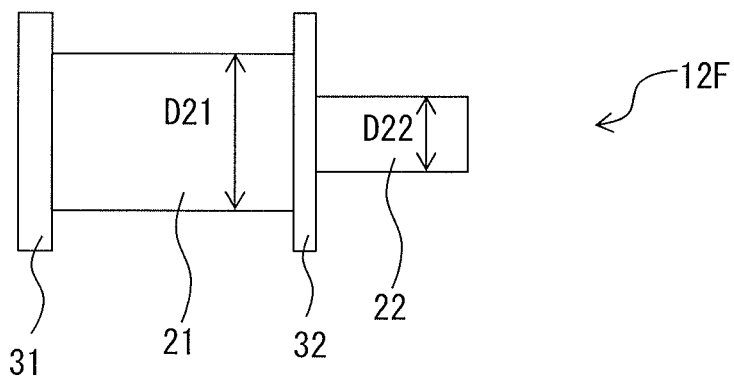
FIG. 7F is a front view of an overall configuration of a magnetic member according to one modification example of the technology.
Figure 8:
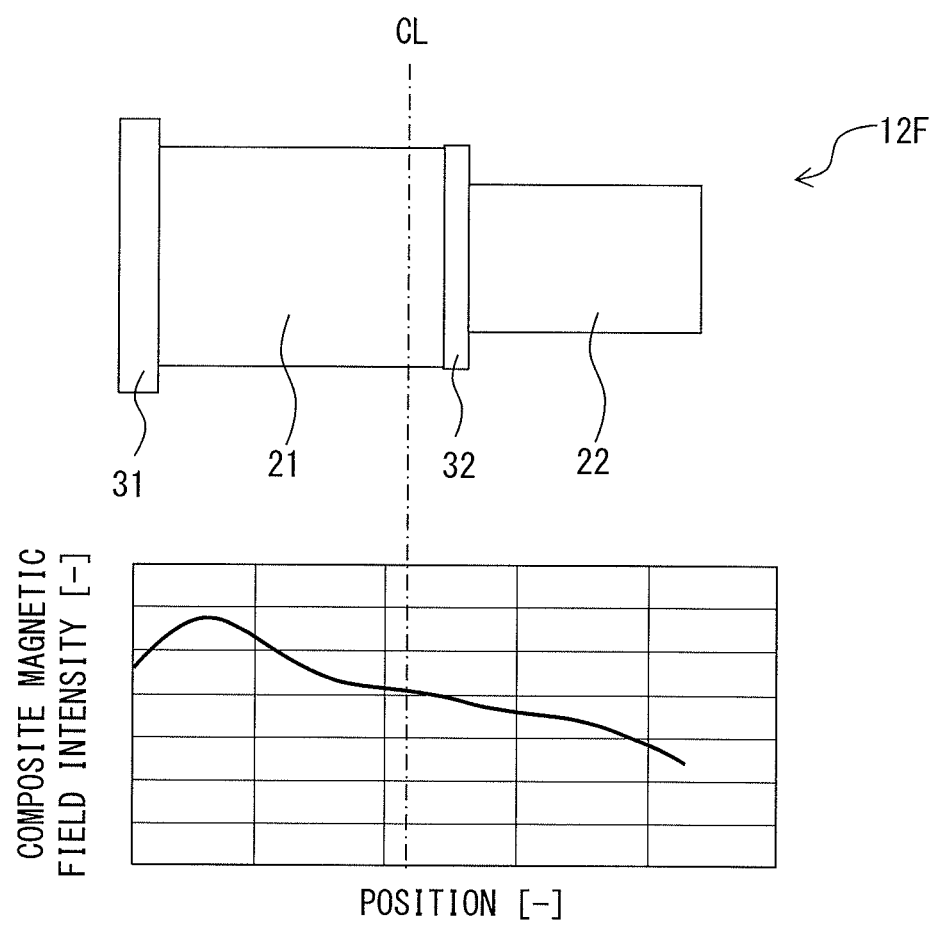
FIG. 8 is a characteristic diagram illustrating an intensity distribution of a magnetic field in the axial direction generated by the magnetic member illustrated in FIG. 7F.

The magnetic member 12F according to Modification Example 6 illustrated in FIG. 7F may be different from the magnetic member 12 according to any of the embodiments described above in that the magnetic member 12F further includes a permanent magnet 22. The permanent magnet 22 may have a maximum outer diameter D22 smaller than the maximum outer diameters D21, D31, and D32. The magnetic member 12F according to Modification Example 6 illustrated in FIG. 7F may be suitable for a case where it is desired to obtain a magnetic field distribution with a specific bias instead of a magnetic field distribution bilaterally symmetrical about the X-Y plane orthogonal to the Z-axis direction. With reference to FIG. 8, for example, the magnetic member 12F according to Modification Example 6 illustrated in FIG. 7F may have a greater magnetic volume at a left side portion extending from a middle position CL in the Z-axis direction than a right side portion extending from the middle position CL. Therefore, the magnetic member 12F may provide the magnetic field intensity distribution in which the magnetic field intensity is higher on the left side portion extending from the middle position CL than the right side portion extending from the middle position CL.

In this way, the magnetic intensity distribution of the magnetic member according to any of the embodiments described above may be modified depending on the intended use by freely setting the number, dimensions, and shape of the permanent magnet, and the number, dimensions, and shape of the magnetic yoke.

Figure 9:
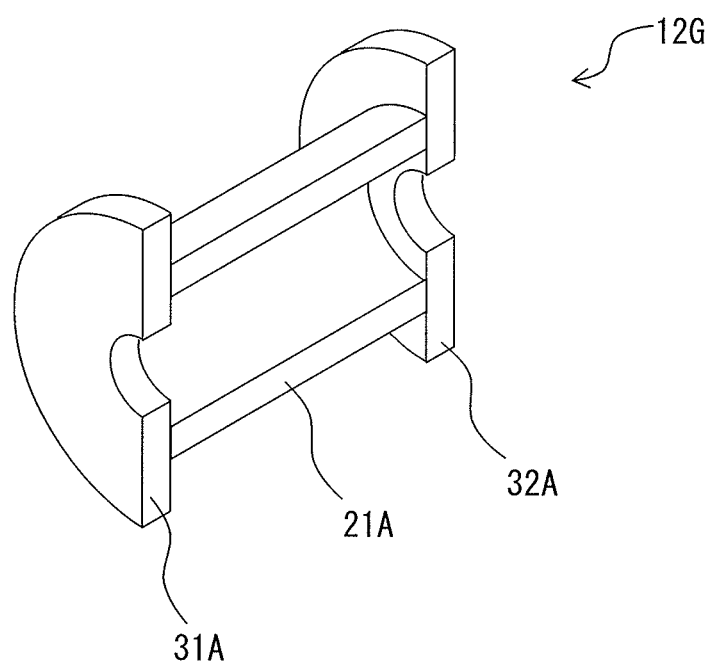
FIG. 9 is a partially broken perspective view of an example configuration of a magnetic member according to one modification example of the technology.

Although the permanent magnet 21 and the magnetic yokes 31 and 32 may have a columnar or disk shape in some of the embodiments and the modification examples described above, the shape of the magnet and magnet yokes should not be limited thereto. In another embodiment, the magnet and magnetic yokes may have a rectangular or elliptic cross-section orthogonal to the moving direction, for example. In still another embodiment, as illustrated in FIG. 9, for example, a cylindrical magnetic member 12G provided with annular magnetic yokes 31A and 32A may be provided. Note that FIG. 9 is a partially broken perspective view of the magnetic member 12G cut in half along the Z-axis direction.

Although the operation unit 4 is disposed inside the sensor package 3P in the magnetic sensor unit 3 in any of the embodiments described above, this is a non-limiting example. In another embodiment, the operation unit 4 may be disposed in a component in the magnetic sensor unit 3 other than the sensor package 3P, or may be disposed outside the magnetic sensor unit 3. In still another embodiment, the operation unit 4 may be an external component outside the position detection apparatus 1.

It is possible to achieve at least the following configurations from the foregoing embodiments and modification examples of the disclosure.

(1) A magnetic unit including:
a magnetic member; and
a retainer that extends in an axial direction and retains the magnetic member,
the magnetic member including
a magnet that extends in the axial direction and has a cross-section orthogonal to the axial direction, and a first maximum outer diameter in a radial direction orthogonal to the axial direction, the cross-section having a substantially constant area in the axial direction, and a first magnetic yoke that is disposed adjacent to a first end of the magnet in the axial direction and has a second maximum outer diameter in the radial direction, the second maximum outer diameter being greater than the first maximum outer diameter.

(2) The magnetic unit according to (1), in which
the magnetic member further includes a second magnetic yoke that is disposed adjacent to a second end of the magnet and has a third maximum outer diameter in the radial direction, the second end of the magnet being opposite to the first end of the magnet adjacent to the first magnetic yoke, the third maximum outer diameter being greater than the first maximum outer diameter.

(3) The magnetic unit according to (2), in which
the magnet, the first magnetic yoke, and the second magnetic yoke each have a columnar or cylindrical appearance with a height in the axial direction.

(4) The magnetic unit according to (2) or (3), in which
the magnet has a first thickness in the axial direction,
the first magnetic yoke has a second thickness in the axial direction,
the second magnetic yoke has a third thickness in the axial direction, and
the first thickness is greater than the second thickness and the third thickness.

(5) A position detection apparatus including:
a magnetic unit including
a magnetic member, and
a retainer that extends in an axial direction and retains the magnetic member,
the magnetic member including
a magnet that extends in the axial direction and has a cross-section orthogonal to the axial direction, and a first maximum outer diameter in a radial direction orthogonal to the axial direction, the cross-section having a substantially constant area in the axial direction, and
a first magnetic yoke that is disposed adjacent to the magnet in the axial direction and has a second maximum outer diameter in the radial direction, the second maximum outer diameter being greater than the first maximum outer diameter; and
a sensor configured to detect a magnetic field that changes in association with a movement of the magnetic unit along the axial direction.

(6) The position detection apparatus according to (5), in which the sensor is configured to detect one or both of an orientation of the magnetic field and an intensity of the magnetic field.

(7) The position detection apparatus according to (5) or (6), further including an operation unit that is configured to detect a position of the magnetic unit relative to the sensor on a basis of the magnetic field detected by the sensor.

(8) A magnetic member including:
a magnet that extends in an axial direction and has a cross-section orthogonal to the axial direction, and a first maximum outer diameter in a radial direction orthogonal to the axial direction, the cross-section having a substantially constant area in the axial direction; and
a magnetic yoke that is disposed adjacent to the magnet in the axial direction and has a second maximum outer diameter in the radial direction, the second maximum outer diameter being greater than the first maximum outer diameter.

According to one embodiment of the technology, the magnetic unit includes the magnet and the first magnetic yoke that are adjacent to each other in the axial direction in which the retainer extends, and the first magnetic yoke protrudes further in the radial direction than the magnet does. This increases the magnetic field intensity in the radial direction generated near the first magnetic yoke.

According to one embodiment of the technology, the position detection apparatus includes the magnet and the first yoke that are adjacent to each other in the axial direction in which the retainer extends, and the first yoke protrudes further in the radial direction than the magnet does. This increases the magnet field intensity in the radial direction, and allows the sensor to detect a change in the magnetic field distribution generated by the magnet even when the sensor positions remote from the magnet. Accordingly, it is possible to downsize the magnet without reducing the distance between the sensor and the magnet.

According to one embodiment of the technology, the magnetic yoke of the magnetic member protrudes further in the radial direction than the magnet disposed adjacent to the magnetic yoke in the axial direction does. This increase the magnetic field intensity in the radial direction generated near the magnetic yoke.

According to one embodiment of the technology, it is possible to achieve the magnetic unit and the position detection apparatus allowing for position detection and having a structure suitable for downsizing. Additionally, it is possible to apply the magnetic member according to any of the embodiments and modification examples of the technology to the position detection apparatus according to any of the embodiments and modification examples described above.

Note that the effects of the embodiments and the modification examples of the technology should not be limited to those described hereinabove and may include any other effects.

What is claimed is:
1. A magnetic unit comprising:
a magnetic member,
a retainer that extends in an axial direction and retains the magnetic member; and
a shaft that is disposed adjacent to the magnetic member in the axial direction and that is coupled to the retainer,
the magnetic member including
a magnet that extends in the axial direction and has a first cross-section orthogonal to the axial direction, and a first maximum outer diameter in a radial direction orthogonal to the axial direction, the first cross-section having a substantially constant area in the axial direction, and
a first magnetic yoke that is disposed adjacent to and disposed to face a first end of the magnet in the axial direction and has a second maximum outer diameter in the radial direction, the second maximum outer diameter being greater than the first maximum outer diameter, the first magnetic yoke having no part that overlaps with the magnet when viewed in a direction perpendicular to the axial direction, wherein:
the magnetic member is entirely included within the retainer,
the retainer has a second cross-section orthogonal to the axial direction, and the second cross-section has a substantially constant area in the axial direction.

2. The magnetic unit according to claim 1, wherein the magnetic member further includes a second magnetic yoke that is disposed adjacent to and disposed to face a second end of the magnet and has a third maximum outer diameter in the radial direction, the second end of the magnet being opposite to the first end of the magnet adjacent to the first magnetic yoke, the third maximum outer diameter being greater than the first maximum outer diameter.

3. The magnetic unit according to claim 2, wherein the magnet, the first magnetic yoke, and the second magnetic yoke each have a columnar or cylindrical appearance with a height in the axial direction.

4. The magnetic unit according to claim 2, wherein the magnet has a first thickness in the axial direction, the first magnetic yoke has a second thickness in the axial direction,
the second magnetic yoke has a third thickness in the axial direction, and
the first thickness is greater than the second thickness and the third thickness.

5. The magnetic unit according to claim 1, wherein the first magnetic yoke has an outer end surface that is orthogonal to the axial direction,
the first end of the magnet in the axial direction has an outer end surface that is orthogonal to the axial direction, and
the outer end surface of the first magnetic yoke and the outer end surface of the first end of the magnet face each other in the axial direction.

6. The magnetic unit according to claim 5, wherein the outer end surface of the first magnetic yoke covers the outer end surface of the first end of the magnet in the axial direction.

7. A position detection apparatus comprising:
a magnetic unit including
a magnetic member;
a retainer that extends in an axial direction and retains the magnetic member; and
a shaft that is disposed adjacent to the magnetic member in the axial direction and that is coupled to the retainer,
the magnetic member including
a magnet that extends in the axial direction and has a first cross-section orthogonal to the axial direction, and a first maximum outer diameter in a radial direction orthogonal to the axial direction, the first cross-section having a substantially constant area in the axial direction, and
a first magnetic yoke that is disposed adjacent to and disposed to face the magnet in the axial direction and has a second maximum outer diameter in the radial direction, the second maximum outer diameter being greater than the first maximum outer diameter, the first magnetic yoke having no part that overlaps with the magnet when viewed in a direction perpendicular to the axial direction; and
a sensor configured to detect a magnetic field that changes in association with a movement of the magnetic unit along the axial direction, wherein the magnetic member is entirely included within the retainer,
the retainer has a second cross-section orthogonal to the axial direction, and
the second cross-section has a substantially constant area in the axial direction.

8. The position detection apparatus according to claim 7, wherein the sensor is configured to detect one or both of an orientation of the magnetic field and an intensity of the magnetic field.

9. The position detection apparatus according to claim 7, further comprising an operation unit that is configured to detect a position of the magnetic unit relative to the sensor on a basis of the magnetic field detected by the sensor.

10. The position detection apparatus according to claim 7, wherein
the first magnetic yoke has an outer end surface that is orthogonal to the axial direction,
the magnet has an outer end surface that is orthogonal to the axial direction, and
the outer end surface of the first magnetic yoke and the outer end surface of the magnet face each other in the axial direction.

11. The position detection apparatus according to claim 10, wherein
the outer end surface of the first magnetic yoke covers the outer end surface of the magnet in the axial direction.

12. A magnetic member comprising:
a magnet that extends in an axial direction and has a first cross-section orthogonal to the axial direction, and a first maximum outer diameter in a radial direction orthogonal to the axial direction, the first cross-section having a substantially constant area in the axial direction; and
a magnetic yoke that is disposed adjacent to and disposed to face the magnet in the axial direction and has a second maximum outer diameter in the radial direction, the second maximum outer diameter being greater than the first maximum outer diameter, wherein
the magnet and the magnetic yoke are arranged adjacent to a shaft in the axial direction,
the first magnetic yoke has no part that overlaps with the magnet when viewed in a direction perpendicular to the axial direction,
the magnetic member is entirely included within a retainer,
the retainer has a second cross-section orthogonal to the axial direction, and
the second cross-section has a substantially constant area in the axial direction.

13. The magnetic member according to claim 12, wherein the magnetic yoke has an outer end surface that is orthogonal to the axial direction,
the magnet has an outer end surface that is orthogonal to the axial direction, and
the outer end surface of the magnetic yoke and the outer end surface of the magnet face each other in the axial direction.

14. The magnetic member according to claim 13, wherein the outer end surface of the magnetic yoke covers the outer end surface of the magnet in the axial direction.

* * * * *